United States Patent [19]
Giering

[11] Patent Number: 5,819,884
[45] Date of Patent: Oct. 13, 1998

[54] CLAMPING DEVICE OF A DISC BRAKE, ESPECIALLY FOR USE WITH HEAVY COMMERCIAL VEHICLES

[75] Inventor: Wilfried Giering, Mendig, Germany

[73] Assignee: Lucas Industries public limited company, West Midlands, Great Britain

[21] Appl. No.: 666,429

[22] PCT Filed: Jan. 11, 1995

[86] PCT No.: PCT/EP95/00085

§ 371 Date: Jun. 21, 1996

§ 102(e) Date: Jun. 21, 1996

[87] PCT Pub. No.: WO95/19511

PCT Pub. Date: Jul. 20, 1995

[30] Foreign Application Priority Data

Jan. 18, 1994 [DE] Germany .......................... 94 00 784 U
Jun. 28, 1994 [DE] Germany .......................... 94 10 454 U

[51] Int. Cl.⁶ ............................. F16D 65/16; F16D 65/56
[52] U.S. Cl. ........................ 188/71.9; 188/72.7; 188/72.9
[58] Field of Search ................... 188/71.7–71.9, 188/72.7–72.9, 196 D, 196 BA, 196; 192/111 A, 111 B, 111 T

[56] References Cited

U.S. PATENT DOCUMENTS

| | | | |
|---|---|---|---|
| 5,353,896 | 10/1994 | Baumgartner et al. | 188/71.9 |
| 5,433,298 | 7/1995 | Antony et al. | 188/72.9 |
| 5,443,141 | 8/1995 | Thiel et al. | 188/71.9 |
| 5,449,052 | 9/1995 | Macke et al. | 188/71.9 |
| 5,520,267 | 5/1996 | Giening et al. | 188/72.7 |
| 5,568,845 | 10/1996 | Baumgartner et al. | 188/71.9 |
| 5,582,273 | 12/1996 | Baumgartner et al. | 188/72.9 |

FOREIGN PATENT DOCUMENTS

| | | |
|---|---|---|
| 0291071A2 | 11/1988 | European Pat. Off. . |
| 0545358A1 | 6/1993 | European Pat. Off. . |
| 0589206A1 | 3/1994 | European Pat. Off. . |
| 4020485A1 | 1/1992 | Germany . |
| 4032886A1 | 4/1992 | Germany . |
| 4204307A1 | 8/1993 | Germany . |
| 4212406A1 | 10/1993 | Germany . |
| 9208699 U | 12/1993 | Germany . |
| WO93/22579 | 11/1993 | WIPO . |

*Primary Examiner*—Robert J. Oberleitner
*Assistant Examiner*—Chris Schwartz
*Attorney, Agent, or Firm*—Wood, Herron & Evans, L.L.P.

[57] ABSTRACT

The clamping device comprises at least one plunger (30) which is displaceable in the direction of a plunger axis (C) for applying a brake pad to a brake disc, and at least one eccentric (24) which is rotatable about a transverse axis (B). A roll body (28) is carried on the eccentric (24) for transmitting actuating forces to the plunger (30). An adjusting member (70) is rotatable about an adjusting axis (D) extending at an angle to the transverse axis (B) to compensate for lining wear. A pin (76) is fixed to the eccentric (24) and cooperates with the adjusting member (70) to transmit the torque for effecting an adjustment to compensate for lining wear. The pin (76) forms part of a safety mechanism (76, 98) by which the roll body (28) is prevented from inadmissibly moving in the direction of the transverse axis (B) with respect to the eccentric (24).

7 Claims, 4 Drawing Sheets

CLAMPING DEVICE OF A DISC BRAKE, ESPECIALLY FOR USE WITH HEAVY COMMERCIAL VEHICLES

BACKGROUND AND SUMMARY OF THE INVENTION

The invention relates to a clamping device of a disc brake, especially for use with heavy commercial vehicles, comprising

- at least one plunger which is displaceable in the direction of a plunger axis for applying a brake pad to a brake disc,
- at least one eccentric which is rotatable about a transverse axis,
- a roll body carried on the eccentric for transmitting actuating forces to the plunger,
- at least one adjusting member which is rotatable about an adjusting axis extending at an angle to the transverse axis to compensate for lining wear, and
- a pin fixed to the eccentric and cooperating with the adjusting member to transmit the torque for effecting an adjustment to compensate for lining wear.

A device of this kind has been known from DE 42 12 406 A1.

It is the object of the invention to allow, in connection with a device of the kind mentioned, a particularly simple and reliable assembly of the, or each, eccentric and the structural elements coacting therewith.

According to the present invention, the object is achieved in that the pin forms part of a safety mechanism by which the roll body is prevented from inadmissibly moving in the direction of the transverse axis with respect to the eccentric. The pin therefore, in addition to its previous function to form part of an angular drive between the eccentric and the adjusting member, has an additional function as a retaining member, which provides for a simplified overall construction.

According to another aspect, the invention relates to a clamping device of a disc brake, especially for use with heavy commercial vehicles, comprising

- at least one plunger which is displaceable in the direction of a plunger axis for applying a brake pad to a brake disc,
- a rotary member which is rotatable about a transverse axis and has at least one eccentric for displacing the plunger, and
- at least one adjusting member which is rotatable about an adjusting axis extending at an angle to the transverse axis to compensate for lining wear,
- wherein one of the two members carries a pin extending into a recess of the other one of the members for transmitting torques.

A clamping device having an angular drive of the kind mentioned above has been known from DE-A-42 04 307 wherein two radially projecting pins are fixed to the rotary body and a drive lever is arranged on the adjusting member, the outer contour of which is similar to a toothing having three teeth and two gaps. Each of the gaps is engaged by one of the two pins, respectively, fixed to the rotary member. Thereby the adjusting member is connected to the rotary member by a kind of mangle gear which has been known since ancient times for angular drives and which, compared to modern toothings, has the drawback that there is only point contact between pins and teeth resulting in high surface pressures that cause wear. Wear, however, is particularly undesirable in an angular drive of the kind discussed above, for it results in that, in the course of time, the brake slack where an adjustment takes place becomes increasingly larger.

The same applies in respect of the clamping device known from DE-A-40 20 485 which also belongs to the afore-described kind comprising an angular drive. Therein, a pin extending radially beyond a rotary member is carried on the latter such that it is pivotable about an axis crossing the axis of the rotary member. Again, a lever is fixed to the adjusting member that is to rotate upon rotations of the rotary member, the lever having a recess into which the pin extends. It cannot be avoided here either that the pin contacts the edge of the associated recess only pointwise, at least, when the rotary member and the adjusting member occupy certain positions.

In another clamping device having been known from DE-A-40 32 886 and belonging as well to the afore-described kind comprising an angular drive, the pin fixed to the rotary member has a spherical head which is embraced in a fork-like manner by a lever mounted to the adjusting member. In the most favorable case it is possible here, however only in the area of a center position of the pin with respect to the lever, to achieve a line contact between pin and lever.

More favorable contacting conditions are achieved with a clamping device known from DE-U-92 08 699, in which also a rotary member rotatable about a first axis for actuating a brake is connected to an adjusting member rotatable about a second axis to compensate for lining wear, the two axes intersecting at a right angle. The two members directly engage each other via bevel gear toothings provided on each of the members. The two bevel gear toothings contact each other at least along one contact line in every operative position. The comparatively favorable contacting conditions demand the high price of relatively high manufacturing costs, however.

According to the second aspect the invention has as another object to design a clamping device comprising an adjusting member for compensating for lining wear in a disc brake in such a way that it can be manufactured with a minimum of expenditure.

Starting from a clamping device of the kind mentioned above the object according to the second aspect of the invention is achieved in that a sliding block is rotatably supported on the pin which is fixed to one of the two members, the sliding block having a profile which is complementary to the sectional shape of the recess in the other one of the two members and being slidingly guided along the recess.

According to a third aspect, the invention relates to a clamping device of a disc brake, especially for use with heavy commercial vehicles, comprising

- at least one plunger which is displaceable in the direction of a plunger axis for applying a brake pad to a brake disc,
- a rotary member which is rotatable about a transverse axis and includes at least one eccentric for displacing the plunger,
- at least one adjusting member adapted to be rotated by the rotary member about an adjusting axis,
- an adjusting drive which is adapted to be driven by the adjusting member to compensate for lining wear at the brake pads,
- a sliding clutch arranged between the adjusting member and the adjusting drive, and a pressure member for transmitting an axial force determining the torque which can be transmitted by the sliding clutch.

In practice, over-adjustments have sometimes been observed with clamping devices of the above-mentioned kind. Therefore, the third aspect of the invention has as yet another object to design a clamping device with adjusting members to compensate for lining wear in a disc brake by simple structural means in such a way that over-adjustments are prevented.

Starting from a clamping device of the above-described kind the object of the invention according to the third aspect is achieved in that the adjusting member and the pressure member are arranged telescopically without contacting each other and are supported independently of each other.

BRIEF DESCRIPTION OF THE DRAWINGS

An embodiment of the present invention will be described with further details below, with reference to diagrammatic drawings, in which.

DETAILED DESCRIPTION OF THE INVENTION

Figure 1:
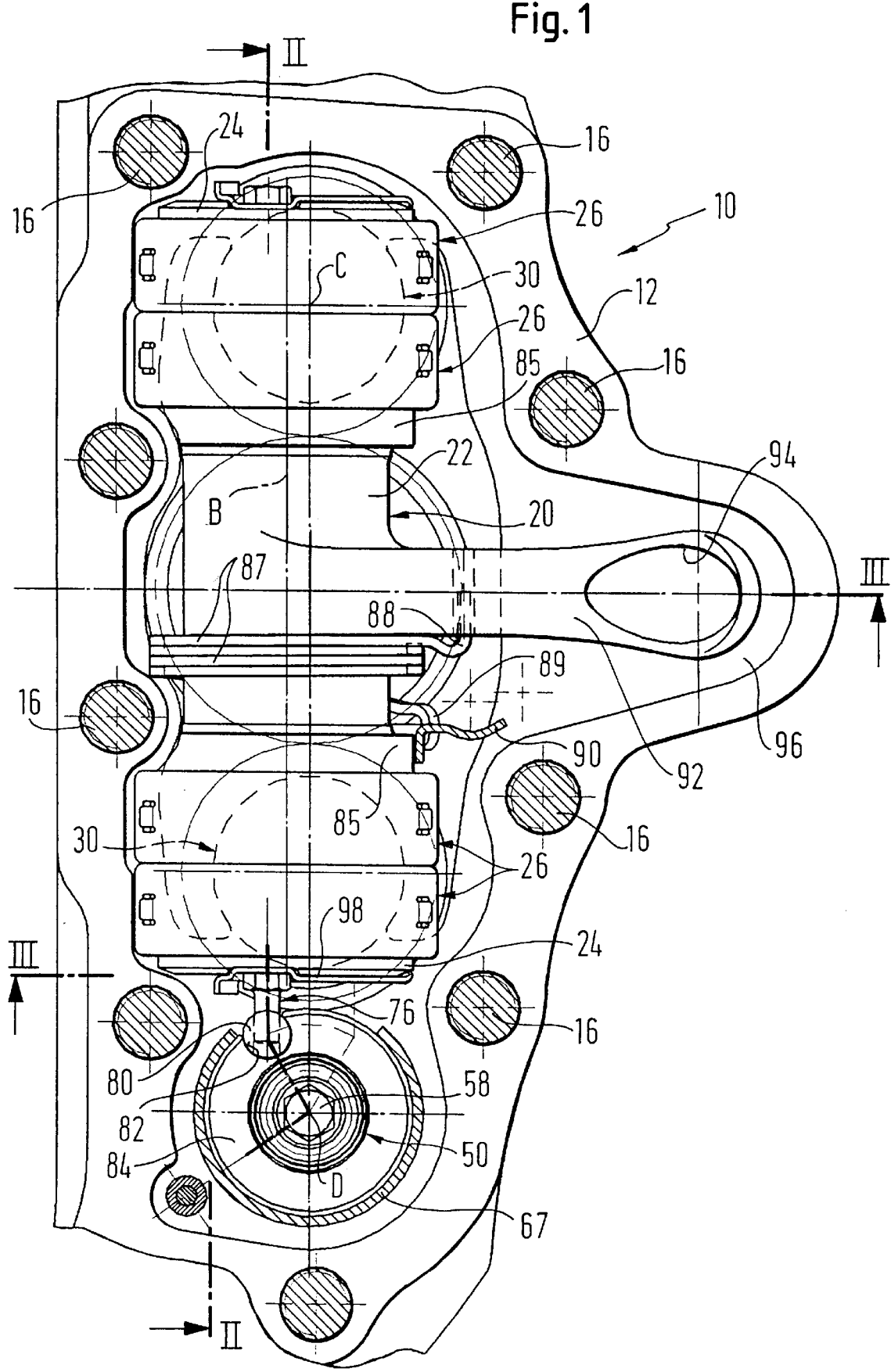
FIG. 1 is a side sectional view of a clamping device along plane I—I in FIG. 2.

The drawings illustrate a clamping device 10 of a conventionally designed disc brake for use with heavy trucks and buses which is assigned to a brake disc (not illustrated) rotatable about a brake disc axis A. The clamping device 10 has a housing 12 constructed to form part of a brake caliper (not illustrated) and closed by a housing cover 14. Strong screws 16 fix the housing cover 14 to the housing 12 and a seal 18 of sheet material is arranged between the two parts. A rotary member 20 is arranged in the housing 12 which is rotatable about a transverse axis B crossing the brake disc axis A at a right angle and accordingly extending parallel to the brake disc. The rotary member 20 has a center portion 22 between two eccentrics 24 each of which is mounted in the housing cover 14 by two cylinder-sector-shaped or cup-shaped roller bearings 26. A roll body 28 is supported by means of a bearing box 28 at each one of the two eccentrics 24, the axis of which extends parallel to the transverse axis B.

One each of two plungers 30 is assigned to the two eccentrics 24, each of said plungers having a plunger axis C extending parallel to the brake disc axis A and intersecting the transverse axis B at a right angle. The plungers 30 are arranged symmetrically with respect to a center plane of the clamping device 10, which contains the brake disc axis A and is normal to the transverse axis B. Each of the two plungers 30 is comprised of a sleeve-shaped plunger portion 32, a bolt-shaped plunger portion 34 and a cap 36. Each of the two sleeve-shaped plunger portions 32 is mounted in a slide bushing 38 press fitted into the housing 12 to be slidable along its proper plunger axis C and rotatable about the same. Each of the plunger portions 32 has an internal thread with which it is screwed on a complementary outer thread of the associated bolt-shaped plunger portion 34. The two caps 36 are press fitted in the associated sleeve-shaped plunger portion 32, each having a planar front face which is averted from said plunger portion 32 and normal to the plunger axis C, on which the associated roll body 28 is adapted to be rolled. In order to prevent wear even with high loads, the caps 36 are made of high-strength steel and are hardened, as are the roll bodies 28. The threads connecting the plunger portions 32 and 34 belonging together are self-restraining such that loads on the plungers 30 in the direction of their respective plunger axis C cannot cause a rotational movement of the plunger portions 32 and 34 with respect to each other.

Each of the two sleeve-shaped plunger portions 32 carries a toothed rim 40 fixed to said portions 32, which meshes with a gear 42 mounted on a central plate 44 for rotation about an axis parallel to the plunger axes C; the plate 44 is axially supported by the two toothed rims 40 and loaded by reset springs 46. The latter are mounted with pre-tension between the central plate 44 and the housing 12 such that they constantly keep the two plungers 30, via the caps 36 thereof, in engagement with the roll bodies 28. The two bolt-shaped plunger portions 34 project axially from the sleeve-shaped plunger portions 32 and the slide bushings 38, have a substantially enlarged diameter in that area and are connected with each other by a protective plate 48 thus being prevented from rotating.

Figure 2:
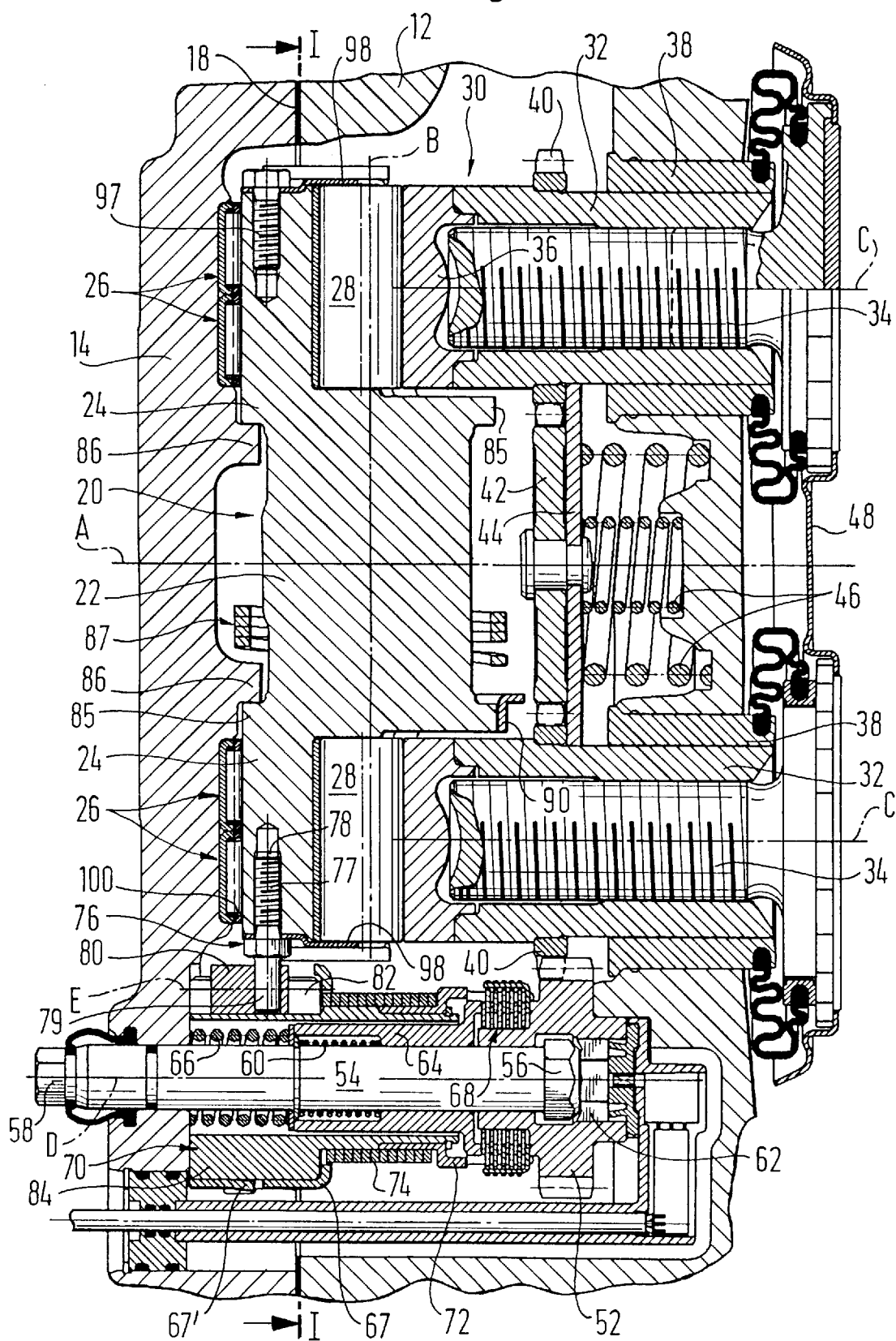
FIG. 2 is the longitudinal section II—II in FIG. 1.

The illustrated clamping device 10 further includes an adjusting means 50 with an adjusting axis D arranged parallel to the plunger axes C. The adjusting means 50 comprises a pinion 52 supported in the housing 12 and constantly meshing with the toothed rim 40 of one of the two plungers 30. A reset shaft 54 is mounted in the pinion 52 and in the housing cover 14 so as to be rotatable about the adjusting axis D and slidable longitudinally. The reset shaft 54 has an inner hexagon head 56 as well as an outer hexagon head 58. Normally, the reset shaft 54 is held by a helical spring 60 in the position illustrated in FIG. 2 in which the inner hexagon head 56 is received in a cavity of the pinion 52 such that the pinion 52 is rotatable uninfluenced by the reset shaft 54. With the aid of a tool, e.g. a socket wrench, engaging the outer hexagon head 58 it is possible to move the reset shaft 54 along the adjusting axis D overcoming the resistance of the helical spring 60 such that the inner hexagon head 56 engages a hexagon socket 62 of the pinion 52. The pinion 52 can be rotated in this manner for rotation of the two sleeve-shaped plunger portions 32 into their respective illustrated starting positions in which the two plungers 30 have their minimum possible length which is a requirement for exchanging worn brake pads for new ones.

A pressure member 64 formed by an inner sleeve is supported on the reset shaft 54 and pre-tensioned towards a sliding clutch 68 designed as multi-plate clutch by a helical spring 66 supported at the housing cover 14 and pressing the clutch plates against each other. A bearing sleeve 67 is by means of a resilient nose 67' formed on it in locking engagement with the housing cover 14 in such a way that it is locked against rotation and axial displacement. A sleeve-shaped adjusting member 70 is mounted in the bearing sleeve 67 to allow rotation but no axial displacement. The adjusting member 70 embraces the pressure member 64, but does not contact it so that torque cannot be transmitted directly from the adjusting member 70 to the pressure member 64. An outer sleeve 72 is supported on the adjusting member 70. A wrap spring 74 constituting an overriding clutch connects-the adjusting member 70 and the outer sleeve 72 such that upon rotation the adjusting member 70 takes along with it the outer sleeve 72 in one direction only. The outer sleeve 72 is connected for common rotation with every second plate of the multi-plate clutch 68, while the other plates are connected to the pinion 52. It is thus possible for the multi-plate clutch to transmit a limited torque from the outer sleeve 72 to the pinion 52 dependent on the pre-tension of the helical spring 66.

The rotary member 20 is connected to the adjusting member 70 by an angular drive described in the following:

A pin 76 extending parallel to the transverse axis B is fixed to the rotary member 20. The pin 76 includes a thread portion 77 screwed into a tap hole 78 of the rotary member 20, which is parallel to the transverse axis B and spaced apart therefrom, and further includes a cylindrical portion 79 projecting from the hole. A sliding block 80 is supported on the cylindrical portion 79 which consists for example of sintered bronze or another self-lubricating material and has the outer shape of a cylinder normal to the pin 76. The cylinder is illustrated as a circle in FIG. 1, whereas it is drawn as a rectangle in FIG. 2. The sliding block 80 is guided in a recess 82 shaped complementarily to the outer shape of the sliding block 80 of a cylinder, having thus the approximate shape of a circular arc in profile; the axis E of the recess 82 extends parallel to the adjusting axis D of the adjusting device 50. The recess 82 is drilled or milled in a flange 84 of the adjusting member 70 such that it is open along its entire length towards the outer surface area of the flange 84 to leave space for the pin 76.

The rotary member 20 has between its center portion 22 and its two eccentrics 24 one collar 85 each which is axially supported at a projection 86 of the housing cover 14. A helical reset spring 87 ending in two legs 88 and 89 is arranged around the center portion 22. Leg 89 is hooked to a retaining sheet element 90 which rests against one of the two collars 85 and is fixed to the housing cover 14 by means of screws 91. The other leg 88 is hooked to an actuating lever 92 forming an integral part with the rotary member 20. The actuating lever 92 has a cup 94 which is engageable by a plunger of the pneumatic actuating cylinder. The actuating cylinder and its plunger have conventional constructions and are therefore not illustrated; a trunk-shaped extension 96 is formed at the housing cover 14 for passage of the plunger.

One mount 98, respectively, being punched from sheet material in the illustrated example is fixed by the pin 76 or a common machine screw 97 to the two ends of the rotary member 20, i.e. to one end face, respectively, of its two eccentrics 24. Each of the mounts 98 shall prevent the roll body 28 supported at the respective eccentric 24 from moving to the outside in the direction of the transverse axis B. The roll bodies 28 are prevented from moving axially to the inside, namely towards the center plane of the clamping device 10, by the center portion 22 of the rotary member 20.

Figure 5:
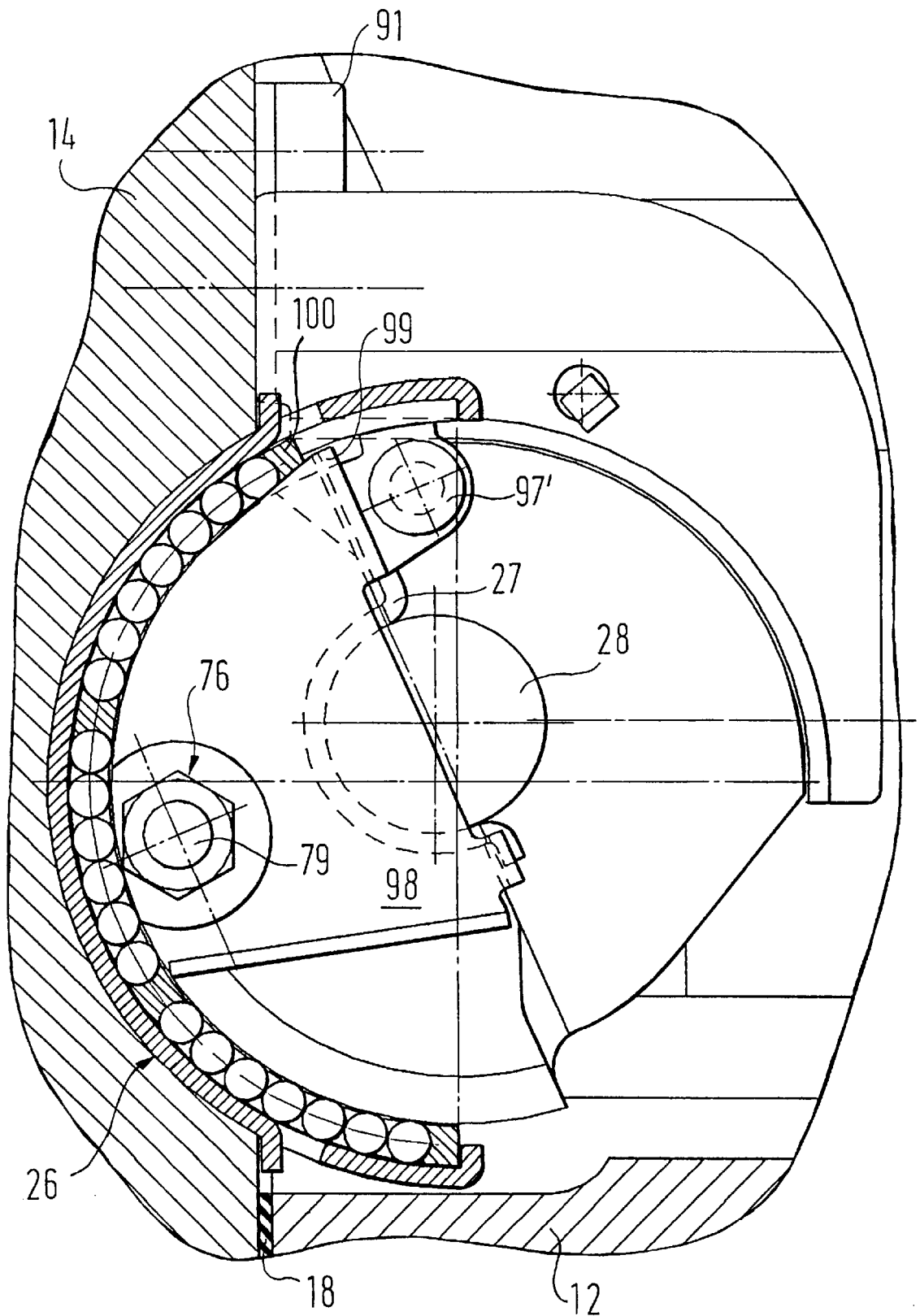
FIG. 5 is an enlarged partial section of FIG. 3.

The two bearing shells 27 are locked against an axial displacement in the same way by one of the two mounts 98, respectively, and by the center portion 22 of the rotary member 20. Moreover, each of the two mounts 98 cooperates with the adjacent roller bearing 26 such that the roll bodies thereof, which are needles in the illustrated example, are in each case urged into their respective starting positions apparent from FIGS. 3 and 5 when, following a brake actuation, the actuating lever 92 returns to its rest position. To this end, each of the mounts 98 has a projection 99 engaging the adjacent roller bearing 26 and acting as catch for a cage 100 in which the roll bodies are retained.

Since each of the two eccentrics 24 in the illustrated example is supported at the housing cover 24 by two roller bearings 26 arranged side-by-side, as seen in axial direction, and the two mounts 98 cooperate in each case only with the directly adjacent outer one of said roller bearings, an additional mount 98' is fixed to the axially inner end of each eccentric 24 which is located adjacent the center portion 22, said additional mount 98' having a projection 99' formed on it with which it engages the roller bearing 26 next to it such that also the cage 100 thereof is urged to return to its rest position following each brake actuation.

In the example illustrated the two mounts 98' are secured to the associated collar 85 by grooved drive studs 97'.

Figure 3:
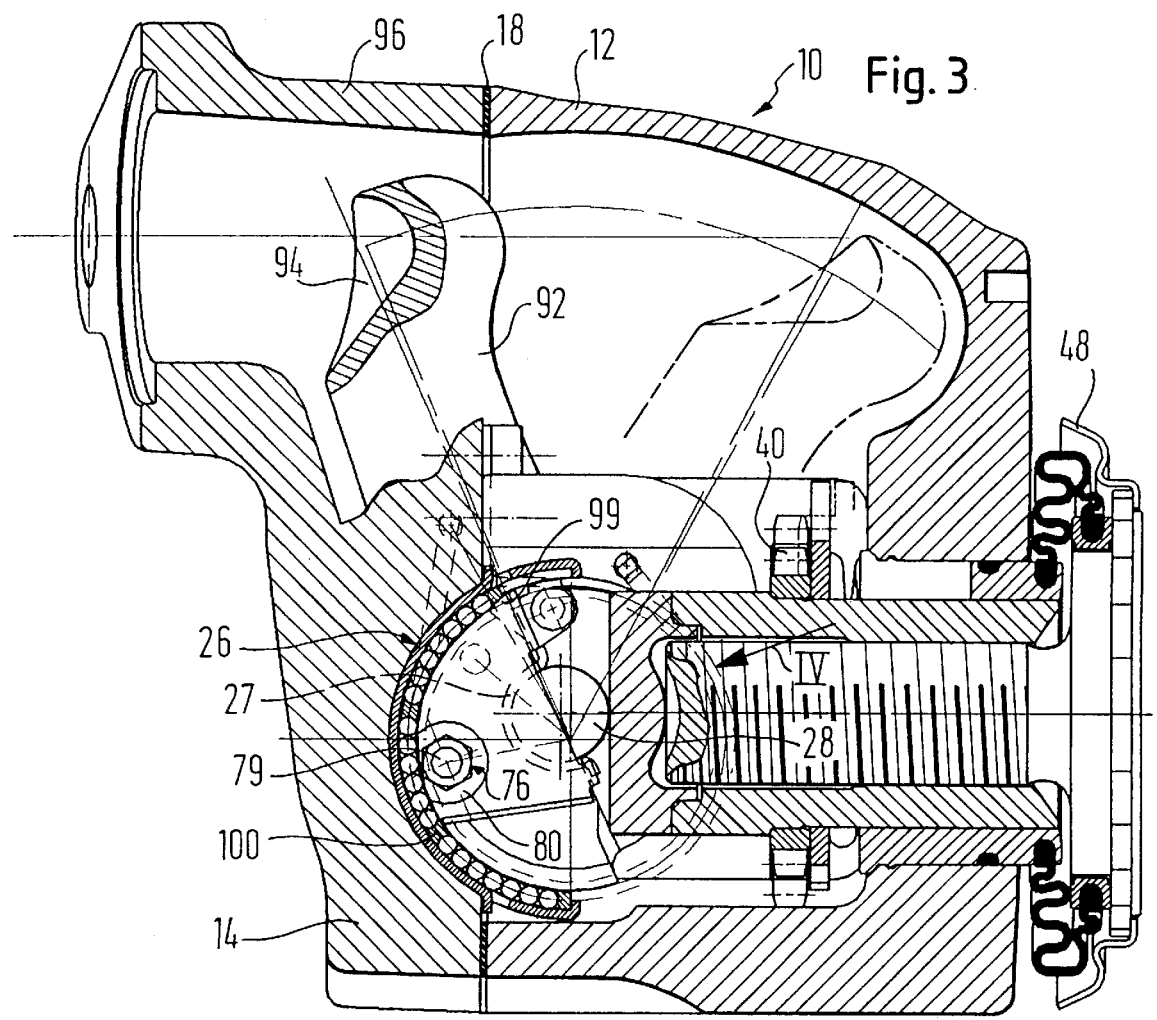
FIG. 3 is the cross section III—III in FIG. 1.
Figure 4:
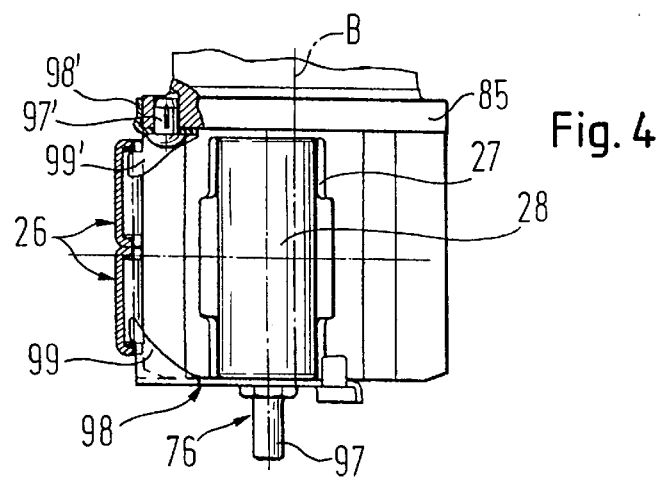
FIG. 4 is a part view in the direction of arrow IV in FIG. 3.

If, starting from the rest position illustrated in the drawings, the rotary member 20 is rotated clockwise about the transverse axis B according to FIG. 3, the roll bodies 28 supported on the two eccentrics 24 of the member 20 urge the two plungers 30 towards the right according to FIG. 3, whereby the brake pads (not illustrated) supported on the bolt-shaped plunger portions 34 are applied to the associated brake disc. At the same time, the described angular drive formed by the pin 76, the sliding block 80 and the recess 82 of the adjusting member 70 causes the translation of the rotation of the rotary member 20 into a rotation of the adjusting member 70 about the adjusting axis D. The rotation is transmitted by the wrap spring 74 to the outer sleeve 72. If the brake slack to be overcome upon brake pad application has exceeded a certain amount due to wear of the brake linings, the torque that the multi-plate clutch 68 is capable of transmitting from the outer sleeve 72 to the pinion 52 suffices to cause a rotation of the sleeve-shaped plunger portions 32, whereby the overall length of each of the two plungers 30 is increased, an adjustment is effected.

The torque adapted to be transmitted by the multi-plate clutch is also decisive for the loading of the sliding block 80 and the recess 82 guiding it. Since both elements have closely fitting, almost completely cylindrical configurations, they contact each other over a relatively large cylindrical surface, so that the surface pressure occurring between them is a minor one, even if the multi-plate clutch 68 is adjusted such that it can transmit a relatively large torque to be able to overcome with certainty frictional resistances in the mutually engaging threads of the plunger portions 32 and 34.

Having described the invention, I claim:

1. A clamping device of a disc brake, especially for use with heavy commercial vehicles, comprising at least one plunger (30) which is displaceable in the direction of a plunger axis (C) for applying a brake pad to a brake disc, at least one eccentric (24) which is rotatable about a transverse axis (B), a roll body (28) carried on the eccentric (24) for transmitting actuating forces to the plunger (30), at least one adjusting member (70) which is rotatable about an adjusting axis (D) extending at an angle to the transverse axis (B) to compensate for lining wear, and a pin (76) fixed to the eccentric (24) and cooperating with the adjusting member (70) to transmit the torque for effecting an adjustment to compensate for lining wear, characterized in that the pin (76) forms part of a safety mechanism (76, 98) by which the roll body (28,) is prevented from inadmissibly moving in the direction of the transverse axis (B) with respect to the eccentric (24).

2. The clamping device as claimed in claim 1 characterized in that the safety mechanism (76, 98) includes a mounting support (98) that is fixed to the eccentric (24) by means of the pin (76).

3. The clamping device as claimed in claim 2 characterized in that the mounting support (98) includes a projection (99) by which it engages a cup-shaped roller bearing (26)

supporting the eccentric (24) ensuring that, in an inoperative position of a rotary member (20), the roller bearing (26) occupies an inoperative position as well.

4. A clamping device of a disc brake, especially for use with heavy commercial vehicles, comprising

- at least one plunger (30) which is displaceable in the direction of a plunger axis (C) for applying a brake pad to a brake disc,
- a rotary member (20) which is rotatable about a transverse axis (B) and has at least one eccentric (24) for displacing the plunger (30), and
- at least one adjusting member (70) which is rotatable about an adjusting axis (D) extending at an angle to the transverse axis (B) to compensate for lining wear,
- wherein one (20) of said two members (20, 70) carries a pin (76) extending into a recess (82) of the other one (70) of said members for transmitting torques characterized in that a sliding block (80) is rotatably supported on the pin (76) which is fixed to one (20) of said two members, said sliding block (80) having a profile which is complementary to the sectional shape of the recess (82) in the other one (70) of the two members and being slidingly guided along said recess (82).

5. The clamping device as claimed in claim 4, characterized in that the pin (76) is fixed to the one member (20) parallel to the axis (B) thereof.

6. The clamping device as claimed in claim 4 characterized in that the external configuration of the sliding block (80) is substantially that of a circular cylinder and the recess (82) of the other one (70) of the two members is a groove extending parallel to the axis (D) of said member (70) and having the cross section of a circular arc.

7. The clamping device of claim 5 characterized in that the external configuration of the sliding block (80) is substantially that of a circular cylinder and the recess (82) of the other one (70) of the two members is a groove extending parallel to the axis (D) of said member (70) and having the cross section of a circular arc.

* * * * *